United States Patent
Kornreich et al.

(10) Patent No.: US 7,289,691 B2
(45) Date of Patent: Oct. 30, 2007

(54) LITHIUM-NIOBATE FIBER OPTIC SENSOR AND SYSTEM

(75) Inventors: Phillip Kornreich, North Syracuse, NY (US); Tracee Jamison, Washington, DC (US); Dawit Negussey, Syracuse, NY (US)

(73) Assignee: FanaSys, LLC, East Syracuse, NY (US)

( * ) Notice: Subject to any disclaimer, the term of this patent is extended or adjusted under 35 U.S.C. 154(b) by 0 days.

(21) Appl. No.: 11/469,500

(22) Filed: Sep. 1, 2006

(65) Prior Publication Data
US 2007/0230860 A1    Oct. 4, 2007

Related U.S. Application Data

(60) Provisional application No. 60/713,410, filed on Sep. 1, 2005.

(51) Int. Cl.
*G02B 6/00*    (2006.01)

(52) U.S. Cl. .............................. 385/12; 385/13; 73/800
(58) Field of Classification Search .................... None
See application file for complete search history.

(56) References Cited

U.S. PATENT DOCUMENTS

| | | | |
|---|---|---|---|
| 4,770,492 A | * | 9/1988 | Levin et al. .................. 385/13 |
| 4,918,305 A | * | 4/1990 | Wlodarczyk et al. .. 250/227.14 |
| 5,245,180 A | | 9/1993 | Sirkis |

* cited by examiner

*Primary Examiner*—Sung Pak
*Assistant Examiner*—Chad H. Smith
(74) *Attorney, Agent, or Firm*—George R. McGuire; David L. Nocilly; Bond, Schoeneck & King PLLC

(57) ABSTRACT

The present invention pertains to Lithium-Niobate fiber optical sensors ("LNCF") and systems for detection of load or pressure and strain or deformation changes that occur in a host material. The host material can be a component of a system, such as a part of a bridge, or a selected material, such as a geofoam, that provides a protective and compliant medium to which the LNCF would be securely attached.

8 Claims, 3 Drawing Sheets

LITHIUM-NIOBATE FIBER OPTIC SENSOR AND SYSTEM

PRIORITY CLAIM

The present application claims priority to U.S. Provisional Application Ser. No. 60/713,410, filed Sep. 1, 2005, the entirety of which is hereby incorporated by reference.

BACKGROUND OF THE INVENTION

The present invention relates generally to fiber sensors, and more particularly to fiber sensors adapted for sensing load or pressure and strain or deformation changes in a host material.

Advancements in photonics and fiber optical technology have revolutionized high speed data communication. In the current state of the technology, the dominant role of optical fibers is for data transmission. Data in the form of photons or light is transmitted through optical fiber lines reliably and securely at very high speed and wide frequency band. To meet optimal requirements on integrity and quality of data transmission, the characteristics of the input and output light through the carrier optical fiber are desired to remain unchanged. Thus the fiber optical line is ideally intended to function as a conduit preserving the intensity, frequency, phase and polarity of the light beam as best possible. In addition to high speed and broadband, fiber optical lines remain immune to effects from electromagnetic interference, interception, heating and arching. These advantages over wire and wireless data transmission media inspired aggressive investment in fiber optical trunk lines in the past decades.

The next phase of the fiber optical revolution is modulation while in transmission. Characteristics of light beam are desired to alter in proportion to physical, thermal, chemical and biological changes. The intention to maximize modulation of a selected light beam property or properties is diametrically opposite to the desired objective of minimizing differences between input and output light in data transmission. Fiber segments that accentuate changes of characteristics desired to be preserved in data transmission are inserted in a network to detect or register relative changes. These fiber segments modulate transmitted light properties by virtue of induced changes in intrinsic or extrinsic conditions. Changes in intensity, frequency, phase, polarity and travel time have been exploited to develop a wide variety of sensors. The speed, reliability, accuracy, range and physical size make fiber optical sensors potentially attractive for a broad spectrum of applications. Incorporation of single or distributed fiber optical sensors within control loop circuits can lead to advances in smart materials and structures, intelligent transportation systems, energy conservation, clean environment, enhanced surveillance and in many fields of science and technology.

The main components of a control loop consist of transmission, detection, processing and actuation. Because of cost and relative development, practical circuits at present consist of mixed electronic and photonic components. The extent of photonic transmission would depend whether the circuit constitutes remote or local control and detection. For remote conditions, the bulk of the transmission can be in existing fiber optical lines. Local sensing and control loops can be fully electronic except for the sensing segment that would remain in photonic mode. Processing and actuating components would be in electronic mode for either local or remote loops. Circuits that entirely consist of photonic transmission, sensing, processing and actuation are not practical or economical at this time. The light input and output to and from the sensor can originate and terminate from a remote site or from close proximity to the sensor. The output is converted to electrical signal for processing and control decision. In turn, the processor controls actuators to initiate an adaptive response. This cycle continues to maintain set objectives for the system operation. An example would be to use sensor input and output to determine the axle load and wheelbase of a vehicle and the control decision may be to collect an appropriate toll charge for the vehicle. If successive sensors are linked, the toll can reflect also the travel time and speed of the vehicle. In addition, the toll can also reflect the time of day and level of traffic. Such a system would revolutionize the efficiency, energy conservation, law enforcement and safety of the highway system. While the technology for such a system exists, associated costs and complexity remain high.

Optical Fibers

An ordinary optical or plain fiber (FIG. 1) is a wave-guide through which light is propagated by continuous total internal reflection within the central core. The glass surrounding the core is known as the cladding. Both the core and cladding glass are dielectric materials. Because the index of refraction of the core is made higher than of the cladding, light waves remain trapped within the core in transmission. Depending on the wave modes utilized in transmission through the core, optical fibers may be classified as single mode or multi mode fiber. Multi mode fibers have core diameters commonly of either 50 or 62.5 µm and can be used for sensors that rely on intensity modulation. Whereas, single mode fibers have diameters in the range of 3 to 10 µm. Long distance communication and data transmission lines are generally of single mode fiber. Single mode and multi mode fibers cannot be coupled. Apart from other inherent limitations, multi mode fiber sensors cannot be integrated within existing communication fiber grid network. Commonly used fiber optical sensors for pressure and strain detection consist of segments of single mode sized fibers that contain Bragg gratings. When the sensor segment is subjected to changes in pressure and compliant strain, the grate spacing becomes altered. Such changes modulate the light wave passing through the sensor segment. Monochromatic light source of high intensity and interferometer detectors are usually required for the sensor system. The cost of such systems can be of the order of several thousand dollars.

It is a principal object and advantage of the present invention to provide an optical sensor that may be incorporated in a host material and used to sense load or pressure and strain or deformation changes in the host material.

It is another object and advantage of the present invention to provide an optical sensor based system for providing continuous feedback regarding the structural integrity of a structure composed of a host material in which the optical sensor is incorporated.

It is a further object and advantage of the present invention to provide an optical sensor that may be economically produced.

Other objects and advantages of the present invention will in part be obvious and in part appear hereinafter.

SUMMARY OF THE INVENTION

In accordance with the foregoing objects and advantages, the present invention provides a system for sensing pressure and strain in a host material, comprising an optical fiber having first and second ends and extending at least partially within the host material, wherein the optical fiber comprises a glass core; a glass cladding surrounding the glass core; and a predetermined material coating the glass core that has an index of refraction that changes in proportion to changes in strain; a first light transmitting fiber having a first end and a second end that is coupled to the first end of the optical fiber; a light source coupled to the first end of said first light transmitting fiber; a second light transmitting fiber having a first end attached to the second end of the optical fiber and a second end; and a light detector coupled to the second end of the second light transmitting fiber.

In particular, the present invention pertains to Lithium-Niobate fiber optical sensors ("LNCF") and systems for detection of load or pressure and strain or deformation changes that occur in a host material. The host material can be a component of a system, such as a part of a bridge, or a selected material, such as a geofoam, that provides a protective and compliant medium to which the LNCF would be securely attached. The compliance of the host material and imposed physical changes on the bonded or attached LNCF segment can be calibrated to operate as sensors. The use and application of Lithium-Niobate Fiber Optical Sensors is anticipated to cover, but would not be limited to, smart materials and structures, intelligent transportation systems, clean air and energy conservation measures, seismic hazard mitigation, sonar detection, surveillance and security enforcements.

BRIEF DESCRIPTION OF THE DRAWINGS

The present will be more fully understood and appreciated by reading the following Detailed Description in conjunction with the accompanying figures, in which.

DETAILED DESCRIPTION

Figure 1:
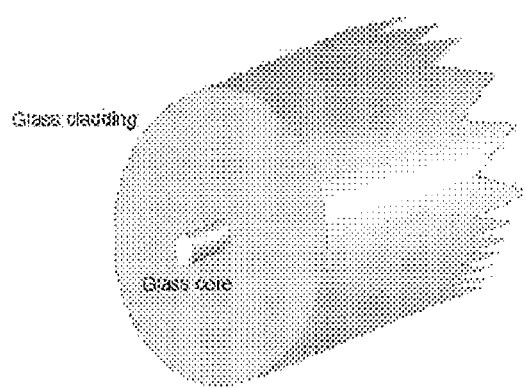
FIG. 1 is a partially cut-away perspective view of a prior art conventional fiber.
Figure 2:
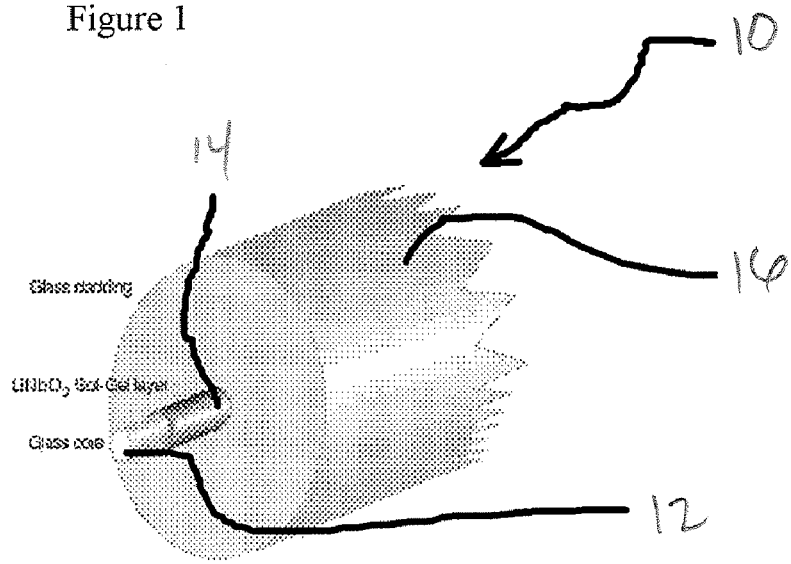
FIG. 2 is a partially cut-away perspective view of a lithium niobate fiber used in accordance with the present invention.

Referring now to the drawings, in which like reference numerals refer to like parts throughout, there is seen in FIG. 2 a lithium niobate fiber (LNCF), designated generally by reference numeral 10, comprising a glass core 12, a sol-gel layer of lithium niobate 14 coating glass core 12, and a glass cladding 16 surrounding layer 14. Lithium Niobate (LiNbO$_3$) is a crystal with excellent electrooptical and acoustooptical properties. The index of refraction (n) of thin film LiNbO$_3$ changes slightly and in proportion with the application of an electric field (electrooptical effect) or the application of stress (piezoelectric effect). LiNbO$_3$ cylinder fiber, such as LNCF 10, is an optical fiber with a thin film of LiNbO$_3$ sol gel material 14 between the core 12 and cladding 16 of the fiber. LNCF 10 preferably has a core diameter in the range of 3 to 10 μm and can mate with single mode data transmission fibers, as will be described hereinafter. LiNbO$_3$ has an index of refraction much greater than either the core or cladding of optical plain fibers. Thus in an LNCF, light mostly propagates in the thin film surrounding the core. Upon application of pressure and development of compliant strain in the LNCF, attenuation of the propagating light intensity takes place. Light intensity attenuation in strained segments of LNCF is due to the stress-induced change in the index of refraction in the thin film where the light propagates. The index of refraction changes slightly causing the light propagating in the thin film to leak into the cladding. As a result, the intensity of the light detected at the output becomes less than the input. Thus, the intensity modulation of LNCF 10 can be a basis for pressure sensing and strain detection in a variety of host materials and applications.

Figure 5:
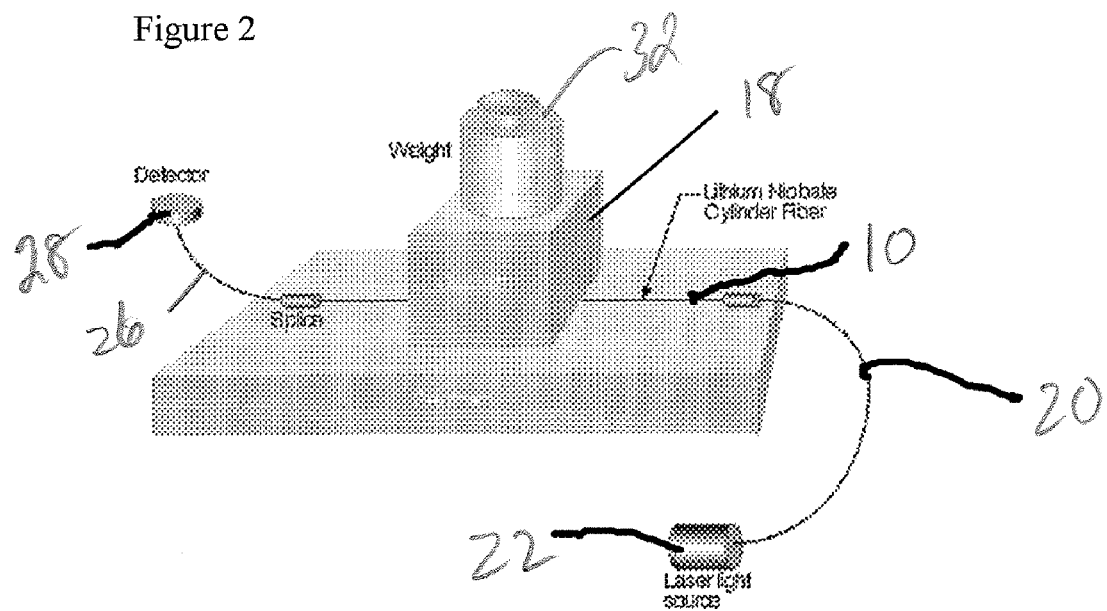
FIG. 5 is a schematic representation of a test set-up and third configuration of the system.
Figure 3:
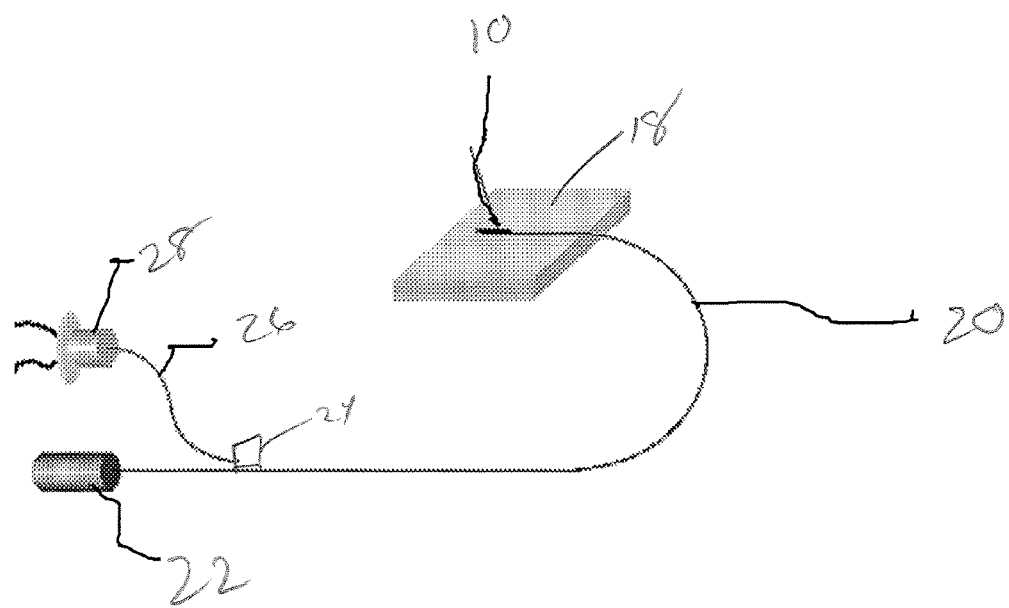
FIG. 3 is a schematic representation of a first configuration of the system.
Figure 4:
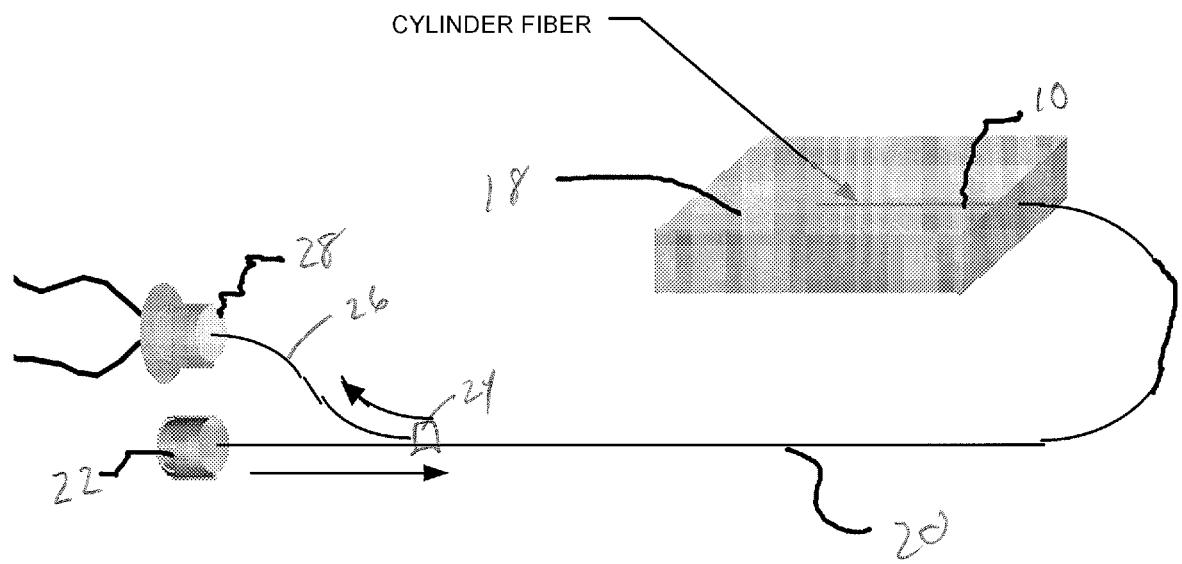
FIG. 4 is a schematic representation of a second configuration of the system.

With reference to FIGS. 3-5, a length of LNCF 10 is surface mounted (FIG. 3) or embedded within (FIG. 4) or through (FIG. 5) a host material 18. In one configuration, as illustrated in FIGS. 3 and 4, a conventional single mode fiber 20 is spliced to one end of LNCF 10, and LNCF 10 includes a reflector (not shown) at its terminal end. The opposite (or leading) end of single mode fiber 20 is connected to a light source 22, such as a LASER. A directional coupler 24 is positioned at an intermediate location along fiber 20 and includes a second, single mode fiber 26 extending therefrom. Directional couple 24 permits the light emanating from light source 22 to pass entirely through fiber 20 and into LNCF 10 where the light, in this configuration, is then reflected back through fiber 20. When the reflected light reaches directional coupler 24, it is fully directed through fiber 26. The terminal end of fiber 26 is connected to a conventional optical detector 28 which detects the output level of the light passing through fiber 26.

In the configuration of FIG. 5, second fiber 26 is spliced to the terminal end of LNCF 10 which, in this configuration, does not include a reflector, but rather permits passage of light therethrough. As with the reflective configurations, detector 28 is still connected to the terminal end of fiber 28, and light source 22 is still connected to the leading end of fiber 20.

In addition to fabricating the sensor in fiber form, it could also be fabricated in sheet form with a central layer of glass surrounded on both sides by the sol gel layer and with a protective glass cladding on the outermost layer. The panel could be incorporated into building facades, road surfaces, or other areas where it would be more conducive to use a fiber sensor configured to mount on a surface in sheet form as opposed to in embedded fiber form.

The invention described herein will be more fully appreciated by describing an experimental test set-up that has been used to verify the efficacy of the present invention. To that end:

Demonstration testing was performed in a fiber optical laboratory using the test set-up shown in FIG. 5. Approximately 150 mm length of LNCF 10 was placed on host material 18, in this test case a geofoam (expanded polystyrene foam) test bed. LNCF 10 was coupled to plain fibers 20 and 26 that respectively connected to a 1550 nm laser light source 22 at one end and a photon detector 28 at the other. A 50 mm cube of geofoam was placed at the center of LNCF 10. After light transmission and detection was initiated, weight was placed on top of host material 18 (the geofoam cube) and the change in light intensity was observed. The same experiment was repeated replacing LNCF 10 with plain fiber.

Figure 6:
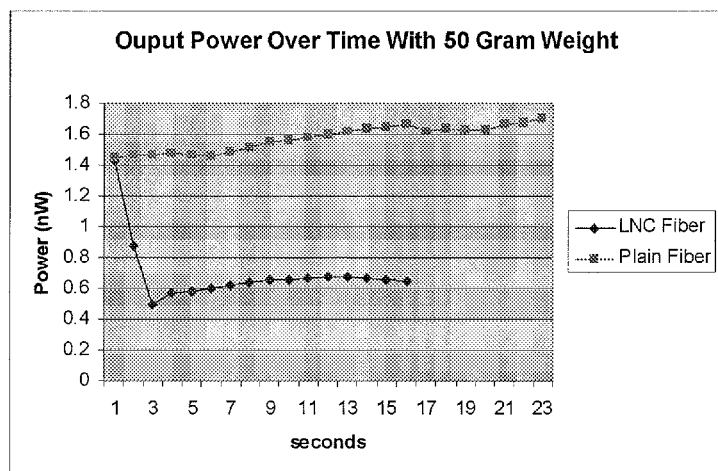
FIG. 6 is a graphical representation of collected test data.

Results of output power immediately before and after placement of a 50 gm weight 32 on the geofoam cube is shown in FIG. 6. The output power from light passing through LNCF 10 attenuated or reduced by about 50 percent in response to pressure induced by the weight on the geofoam. Once the LNCF and geofoam adjusted to the change in pressure, the output power remained relatively steady at the attenuated level. In the repeat test where the LNCF was replaced with plain fiber, the equivalent induced pressure did not result in significant change of output power.

The geofoam medium used in the experiment is soft and relatively compliant and serves as a good host material. Induced pressures by the small applied load resulted in very small strain in the geofoam and alternate LNCF and plain fiber sandwiched between the upper and lower geofoam blocks. The observed contrast in output light attenuation between the LNCF and plain fiber segments encapsulated by the geofoam demonstrates the LNCF and host medium response can be calibrated to detect a wide range of strain and pressure changes that occur in a host medium. With enhancements that promote micro bending along the LNCF and localized strain development (e.g., enhancements that magnify the localized strain, such as dummy transverse fibers, fiber grids on sheeting or matting, and the like) coupled with adjustments in capture area (e.g., increasing the number of fibers per length or area; fixing the sensor position, but providing slack on reserve movement in the lead fibers; spooling or zig-zagging the pattern of the sensor in the sensing area; controlling the thickness of the sol-gel layer to control the sensitivity, and the like), LNCF based sensors can detect a wide range of disturbances ranging from sonar to seismic waves and pedestrian to vehicle traffic.

Geofoam as a medium for LNCF offers several potential advantages. A sensor network or grid in 1, 2 or 3 dimensions can be formed for placement in a geofoam block mold. Encapsulating geofoam of desired size can be formed to contain the sensor grid. The outer skin of the geofoam can be shaped and surface treated to enhance performance and provide protection. Grid crossings are adequate to promote sufficient micro bending. Presence of multiple fibers would offer redundancy and reliability and also disturbance direction detection capability. Geofoam has very low density and high R-value. These special properties can be useful to produce a wide range of overall sensor sizes of manageable weight and very little variation in internal stress distribution due to self-weight. The high R-value of geofoam can be useful in moderating temperature changes or maintaining steady operating temperatures. The sensor system consisting of the LNCF sensors, light sources, detectors, multiplexers, microprocessor circuits and data storage or broadcast components can all be housed within the geofoam encasement.

Other host materials are, of course, possible. For instance, incorporating LNCF 10 in a pre-stressed concrete that will ultimately be used in a construction would be a typical host material. In addition, structural materials, such as steel I-beams may also serve as the host material, as can the material composing a machine that is the subject of vibration monitoring or analysis. Furthermore, LNCF 10 could be mounted to pipelines, tunnel walls, bridge structures/girders, building facades, and the like, composed of composite materials, plastic, or aluminum, for instance.

LNCF 10 can be easily integrated in new or existing single mode communication fiber networks. Thus, LNCF sensors can rely on remote light source and detection, rapid wide band data transmission or can be networked with other sensors and systems to accomplish a variety of coordinated intelligent tasks. LNCF sensors do not require special treatment such as etching necessary to form Bragg gratings. Drawing of LNCF is not different than for production of plain fiber. Furthermore, because LNCF sensors rely on intensity modulation, requirements for source power and coherence can be easily met by conventional power lasers or LEDs. Whereas interferometer detectors for Bragg grating sensors are relatively expensive, commercially available, phototransistor amplitude detectors can be used as the photo detector 28 for LNCF 10. Microprocessors and multiplexers or supplementary components for fiber sensors are generally mass-produced for a variety of applications and are not very expensive to build or purchase. Thus in addition to high sensitivity, low weight, temperature stability, size compatibility for integration in existing communication fiber networks; LNCF sensors 10 offer operational simplicity and cost savings relative to comparable alternative fiber sensor systems.

The present invention has been described in terms of the best mode known to the inventors and with specific embodiments. However, the scope and spirit of the present invention should not be limited thereby, but rather construed consistent with the appended claims.

What is claimed is:

1. A system for sensing pressure and strain in a host material, comprising:
   a. an optical fiber having first and second ends and extending at least partially within the host material, said optical fiber comprising:
      i. a glass core;
      ii. a glass cladding surrounding said glass core; and
      iii. a predetermined material coating said glass core and having an index of refraction that changes in proportion to changes in strain;
   b. a first light transmitting fiber having a first end and a second end that is coupled to said first end of said optical fiber;
   c. a light source coupled to said first end of said first light transmitting fiber;
   d. a second light transmitting fiber having a first end attached to said second end of said optical fiber and a second end;
   e. a light detector coupled to said second end of said second light transmitting fiber.

2. The system of claim 1, wherein said first and second light transmitting fibers each comprise a glass core concentrically positioned within a glass cladding.

3. The system of claim 1, wherein the host material is selected from the group consisting of geofoam, steel, concrete, plastic, aluminum, and composite material.

4. The system of claim 1, wherein said light source is selected from the group consisting of a power LED and a laser.

5. The system of claim 4, wherein said laser generates light at 1550 nm.

6. The system of claim 1, wherein said predetermined material comprises a sol-gel layer of $LiNbO_3$ coating said glass core.

7. The system of claim 1, wherein said optical fiber includes a reflector positioned therein, and said light source and said light detector are positioned on the same side of the host material.

8. The system of claim 2, wherein said light source and said light detector are positioned on opposite sides of the host material.

* * * * *